United States Patent
Roshen (10) Patent No.: US 7,996,394 B2
(45) Date of Patent: *Aug. 9, 2011

(54) SYSTEM AND METHOD FOR PERFORMING ADVANCED SEARCH IN SERVICE REGISTRY SYSTEM

(75) Inventor: Waseem Ahmed Roshen, Hilliard, OH (US)

(73) Assignee: International Business Machines Corporation, Armonk, NY (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/174,944

(22) Filed: Jul. 17, 2008

(65) Prior Publication Data

US 2010/0017387 A1    Jan. 21, 2010

(51) Int. Cl.
*G06F 17/30* (2006.01)
(52) U.S. Cl. .................................................. 707/723
(58) Field of Classification Search .................. None
See application file for complete search history.

(56) References Cited

U.S. PATENT DOCUMENTS

| | | | |
|---|---|---|---|
| 5,274,806 A | 12/1993 | Hill | |
| 6,519,585 B1 | 2/2003 | Kohli | |
| 6,961,937 B2 * | 11/2005 | Avvari et al. | 718/104 |
| 7,124,062 B2 | 10/2006 | Gebhart | |
| 7,321,919 B2 | 1/2008 | Jacobs et al. | |
| 7,634,462 B2 | 12/2009 | Weyand et al. | |
| 7,676,460 B2 | 3/2010 | Morgan | |
| 7,676,462 B2 | 3/2010 | Kirkland et al. | |
| 7,676,472 B2 | 3/2010 | Kurhekar et al. | |
| 7,693,829 B1 | 4/2010 | Alshawi | |
| 2004/0064554 A1 * | 4/2004 | Kuno et al. | 709/225 |
| 2004/0186831 A1 | 9/2004 | Hiratsuka et al. | |
| 2005/0065920 A1 | 3/2005 | He et al. | |
| 2005/0114306 A1 * | 5/2005 | Shu et al. | 707/3 |
| 2006/0265508 A1 * | 11/2006 | Angel et al. | 709/230 |
| 2007/0033167 A1 * | 2/2007 | Basu et al. | 707/3 |
| 2007/0162421 A1 | 7/2007 | Pang et al. | |
| 2007/0263534 A1 | 11/2007 | Pavlick | |
| 2008/0059486 A1 | 3/2008 | Pappas | |
| 2008/0069124 A1 | 3/2008 | Patrick | |
| 2008/0086370 A1 | 4/2008 | Narayanaswami et al. | |

(Continued)

FOREIGN PATENT DOCUMENTS

EP    1855218 A2    11/2007

(Continued)

OTHER PUBLICATIONS

Papazoglou et al., "Service Oriented Architectures: Approaches, Technologies and Research Issues," VLDB Journal, Springer Berlin / Heidelberg, vol. 6, No. 3, Jul. 2007, pp. 389-415(27).

(Continued)

*Primary Examiner* — Bai D Vu
(74) *Attorney, Agent, or Firm* — Schmeiser, Olsen & Watts; John R. Pivnichny (57) ABSTRACT

A system and associated method for searching a service registry system with a service name. The present invention receives a request to search a service description with the service name. If conventional search does not find a match for the service name in a registry, the present invention parses the service name and generates candidate service names for alternative searches from synonyms stored in a dictionary database. The registry is searched again with generated candidate service names and any service description found to be a match of any candidate service name is returned.

16 Claims, 4 Drawing Sheets

U.S. PATENT DOCUMENTS

| | | |
|---|---|---|
| 2008/0091670 A1 | 4/2008 | Ismalon |
| 2008/0120380 A1 | 5/2008 | Boyd et al. |
| 2008/0133508 A1 | 6/2008 | Jiang et al. |
| 2008/0208835 A1 | 8/2008 | Sauls et al. |
| 2008/0306751 A1 | 12/2008 | Conroy et al. |
| 2009/0018998 A1 | 1/2009 | Patten, Jr. et al. |
| 2009/0049040 A1 | 2/2009 | Fay et al. |
| 2009/0063522 A1 | 3/2009 | Fay et al. |
| 2009/0070456 A1 | 3/2009 | Brown et al. |
| 2009/0089078 A1 | 4/2009 | Bursey |
| 2009/0089277 A1 | 4/2009 | Cheslow |
| 2009/0125332 A1 | 5/2009 | Martin |
| 2009/0132698 A1 | 5/2009 | Barnhill, Jr. |
| 2009/0144262 A1 | 6/2009 | White et al. |
| 2009/0144266 A1 | 6/2009 | Bicioglu |
| 2009/0193096 A1 | 7/2009 | Boyer et al. |
| 2009/0210408 A1 | 8/2009 | Boyer et al. |
| 2009/0222429 A1 | 9/2009 | Aizenbud-Reshef et al. |
| 2009/0235167 A1 | 9/2009 | Boyer et al. |
| 2010/0017405 A1 | 1/2010 | Roshen |
| 2010/0036838 A1 | 2/2010 | Ellis |
| 2010/0042590 A1 | 2/2010 | Smyros et al. |

FOREIGN PATENT DOCUMENTS

| | | |
|---|---|---|
| WO | 2006110684 | 10/2006 |
| WO | 2006113092 A2 | 10/2006 |
| WO | 2008078366 A1 | 12/2006 |

OTHER PUBLICATIONS

Soto-Carrion et al., "General Ontology Service Engine (GORSE): a new approach to integrate the semantic web knowledge on service oriented architectures," pp. 1-22 retrieved Nov. 2009. http://www.imai-software.com/openlab/data/GROSE__DRAFTv0__1.pdf.

"osESB Documentation, Part 1: The SOA Stack and the ESB," Nov. 5, 2007, pp. 1-22. http://www.osesb.org/documentation/The%20SOA%20Stack%20and%20the%20ESB.pdf.

Pohlsen et al., "A Concept for a Medical Device Plug-and-Play Architecture based on Web Services," pp. 1-7, retrieved Oct. 20, 2009. http://sigbed.seas.upenn.edu/archives/2009-07/SchlichtingSIGBED.pdf.

Lausen et al; Survey of Current Means to Discover Web Services; Semantic Technology Institute (STI) Aug. 2008; 15 pages.

Ahmadi et al.; Flexible Matching and Ranking of Web Service Advertisements; Nov. 2007; 22 pages.

Mokhtar et al.; Interoperable Semantic & Tyntactic Service Matching for Ambient Computing Environments; Aug. 2008; 11 pages.

Bai et al; Resource Matching and a Matchmaking Service for an Intelligent Grid; International Conference on Computational Intelligence 2004; 4 pages.

Corrales et al.; BeMatch: A Platform for Matchmaking Service Behavior Models; Mar. 2008; 5 pages.

Medjahed et al.; Composing Web Services on the Semantic Web; The VLDB Journal (2003); pp. 333-351.

Nawaz et al.; SEMREG-PRO: A Semantic based Registry for Proactive Web Service Discovery using Publish-Subscribe Model; Fourth International Conference on Semantics, Knowledge and Grid, IEEE 2008; pp. 301-308.

Office Action (Mail Date Nov. 8, 2010) for U.S. Appl. No. 12/175,552, filed Jul. 18, 2008; Confirmation No. 1797.

U.S. Appl. No. 12/945,151, filed Nov. 12, 2010; Confirmation No. 7151.

U.S. Appl. No. 12/945,337, filed Nov. 12, 2010; Confirmation No. 7540.

Notice of Allowance (Mail Date Feb. 11, 2011) for U.S. Appl. No. 12/175,552, filed Jul. 18, 2008; Confirmation No. 1791.

U.S. Appl. No. 13/039,368, filed Mar. 3, 2011; First Named Inventor: Waseem A. Roshen; Confirmation No. 1759.

Roshen, Waseem, Ph. D., "Service Registry with Advanced Search Capability, Part 1: Concepts, Process, and Components", Internet Article Dated Nov. 6, 2009, pp. 1-9. [retrieved from http://public.dhe.ibm.com/software/dw webservices/ws-SOAregadvsearch/ws-SOAregadvsearch-pdf.pdf on Jan. 11, 2011].

Balani, Naveen, "Model and Build ESB SOA Frameworks", Internet Article Dated Mar. 15, 2005, pp. 1-4. [retrieved from http://www.ibm.com/developerworks/web/library/wa-soaesb/ on Jan. 12, 2011].

International Search Report for PCT/EP2010/066559, Dated Jan. 27, 2011. 5 pages.

U.S. Appl. No. 12/625,250, filed Nov. 24, 2009; Confirmation No. 9872.

* cited by examiner

SYSTEM AND METHOD FOR PERFORMING ADVANCED SEARCH IN SERVICE REGISTRY SYSTEM

FIELD OF THE INVENTION

The present invention discloses a system and associated method for improving search functionalities of a service registry system to decouple the service registry system from a software application that employs services defined in the service registry system.

BACKGROUND OF THE INVENTION

Conventional software application development environments, often referred to as an integrated development environment (IDE), do not provide sufficient supports for a specific type of end products that is being development with the IDE. When an end product is a Service-Oriented Architecture (SOA) business application, it is desirable for the IDE to support a parallel development of both client modules and service modules of the SOA business application to shorten a development time, and to support loose couplings of tasks requested by clients and services provided by the service modules to make the SOA business application more portable and flexible for other business needs and platforms. Conventional software application development environments do not have features either supporting such parallel development of client and service modules or loosely coupling client and service modules within a same software application project.

Thus, there is a need for a system and associated method that overcomes at least one of the preceding disadvantages of current methods and systems for a software application development environment.

SUMMARY OF THE INVENTION

The present invention provides a method for searching a service registry system with a service name, the method comprising:

receiving a request to locate, in a registry of the service registry system, a service description that corresponds to the service name specified in the request, wherein the registry comprises at least one service description searchable by a respective service identifier;

subsequent to said receiving, determining that the service name specified in the request does not match any service identifier discovered in the registry;

subsequent to said determining, parsing the service name into at least one component word;

subsequent to said parsing, producing a respective synonym list for each component word of said at least one component word from a dictionary database of the service registry system;

subsequent to said producing, generating at least one candidate service name with said respective synonym list for each component word;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system upon which the service registry system operates.

The present invention provides a computer program product, comprising a computer usable medium having a computer readable program code embodied therein, said computer readable program code containing instructions that when executed by a processor of a computer system implement a method for searching a service registry system with a service name, the method comprising:

receiving a request to locate, in a registry of the service registry system, a service description that corresponds to the service name specified in the request, wherein the registry comprises at least one service description searchable by a respective service identifier;

subsequent to said receiving, determining that the service name specified in the request does not match any service identifier discovered in the registry;

subsequent to said determining, parsing the service name into at least one component word;

subsequent to said parsing, producing a respective synonym list for each component word of said at least one component word from a dictionary database of the service registry system;

subsequent to said producing, generating at least one candidate service name with said respective synonym list for each component word;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system upon which the service registry system operates.

The present invention provides a computer system comprising a processor and a computer readable memory unit coupled to the processor, said memory unit containing instructions that when executed by the processor implement a method for searching a service registry system with a service name, the method comprising:

receiving a request to locate, in a registry of the service registry system, a service description that corresponds to the service name specified in the request, wherein the registry comprises at least one service description searchable by a respective service identifier;

subsequent to said receiving, determining that the service name specified in the request does not match any service identifier discovered in the registry;

subsequent to said determining, parsing the service name into at least one component word;

subsequent to said parsing, producing a respective synonym list for each component word of said at least one component word from a dictionary database of the service registry system;

subsequent to said producing, generating at least one candidate service name with said respective synonym list for each component word;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system upon which the service registry system operates.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for searching a service registry system with a service name, the method comprising:

receiving a request to locate, in a registry of the service registry system, a service description that corresponds to the service name specified in the request, wherein the registry comprises at least one service description searchable by a respective service identifier;

subsequent to said receiving, determining that the service name specified in the request does not match any service identifier discovered in the registry;

subsequent to said determining, parsing the service name into at least one component word;

subsequent to said parsing, producing a respective synonym list for each component word of said at least one component word from a dictionary database of the service registry system;

subsequent to said producing, generating at least one candidate service name with said respective synonym list for each component word;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system upon which the service registry system operates.

The present invention provides a method and system that overcomes at least one of the current disadvantages of conventional method and system for searching a web service registry system while developing a client application employing services registered in the web service registry system.

DETAILED DESCRIPTION OF THE INVENTION

Figure 1:
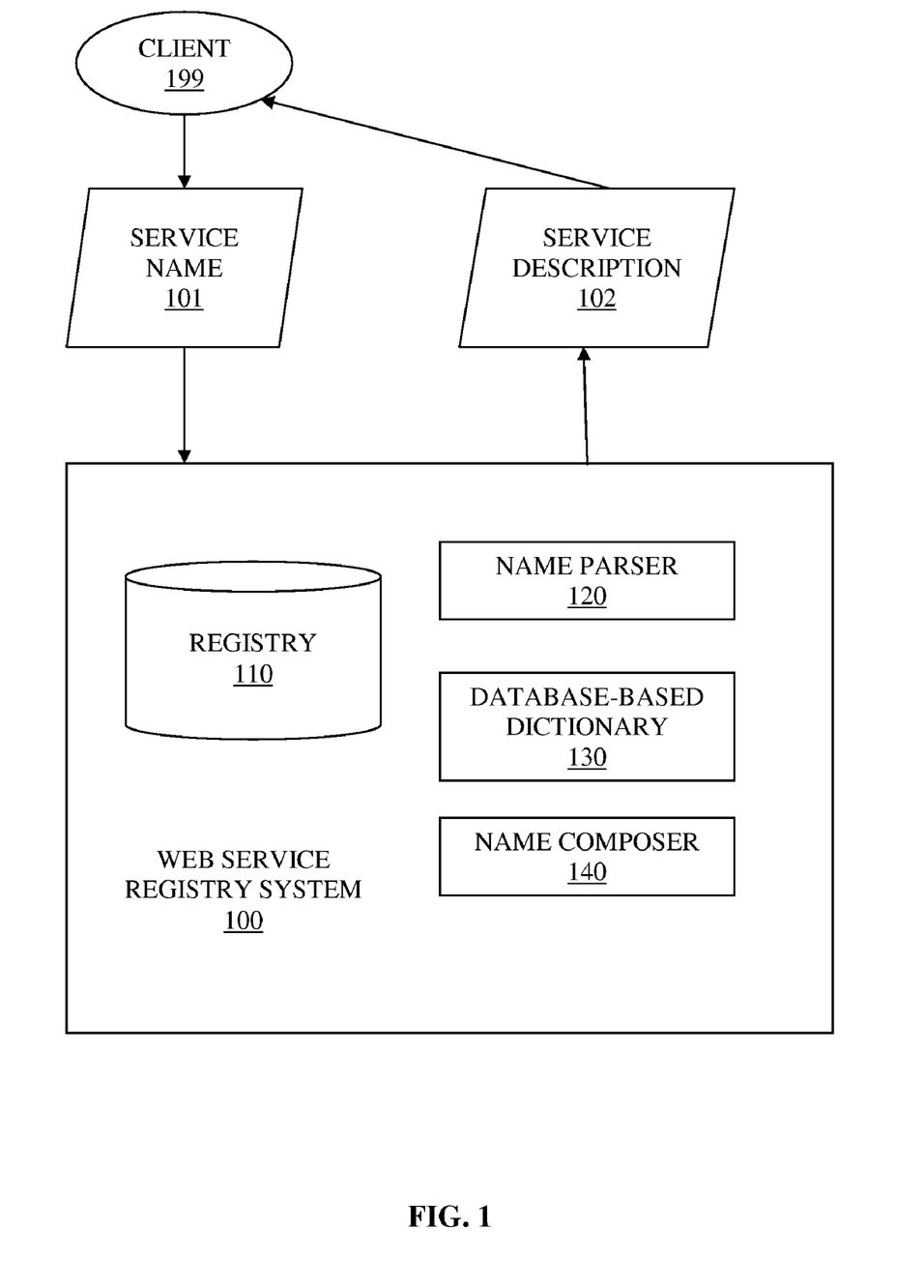
FIG. 1 illustrates a system looking up a web service registry system for a service name, in accordance with embodiments of the present invention.

FIG. 1 illustrates a system looking up a web service registry system 100 for a service name 101, in accordance with embodiments of the present invention.

A web service or a service is defined as a software system designed to support interoperation and/or interactions between machines over a network. The web service has an interface described in a format that can be processed by a computer processor. Examples of such format may be, inter alia, Web Services Description Language (WSDL) in implementing the Universal Description, Discovery, and Integration (UDDI) interface, etc. The web service is provided in a business process model called a Service-Oriented Architecture (SOA). The Service-Oriented Architecture (SOA) is defined as a business-driven software system that supports integration and linkage of business tasks or web services. The Service-Oriented Architecture (SOA) supports customers by making the software system easily and cost-effectively adaptable to changing business needs of customers. To keep the flexibility of the Service-Oriented Architecture (SOA), each individual business process desired by customers should be loosely coupled to relevant business tasks or services that are implemented by the software system. Also, because of rapidly changing business needs, software modules of the Service-Oriented Architecture (SOA) are often developed concurrently. Consequently, client modules should be developed during service definition is not known in a complete form.

In this specification, the term web service and the term service are used interchangeably. A web service registry system 100 supports a parallel development of client modules and service modules of a Service-Oriented Architecture (SOA) software system, by providing loose coupling of service definitions provided in the software project and corresponding service descriptions that associates tasks that should be performed according to the service definition. The SOA software system comprises at least one web service. Each web service provided by the SOA software system is identified by a service name 101, and a service description 102 corresponding to the service name 101 is registered in the web service registry system 100.

The web service registry system 100 is a collection of software components and data repositories in the Service-Oriented Architecture (SOA) software system used to publish, discover and manage said at least one web services. The web service registry system 100 is a central reference point in storing and managing metadata for said at least one web services within the Service-Oriented Architecture (SOA) of the SOA software system. Information described in metadata for a web service may be, inter alia, what the service is, how the service is used, and how the service is interconnected with other components, etc. The metadata for web services fosters reuse of services assets and to govern services throughout the lifecycle of the Service-Oriented Architecture of the SOA software system. Examples of the web service registry system 100 may be, inter alia, WebSphere® Service Registry and Repository (WSRR) by IBM®, etc. (WebSphere and IBM are trademarks of the International Business Machines, Inc., registered in the United States and other countries.) In this specification, the service description 102 refers to the metadata published and stored in the web service registry system 100 that corresponds to a respective service identified by the service name 101.

In conventional web service registry system, to discover a service description during development of a software system, a programmer of the software system needs to know a service name identifying the service description. Although there is a find_service operation to find a service in the Universal Description, Discovery, and Integration (UDDI) interface of the conventional web service registry system, the find_service operation is impractically difficult to use for the programmer while developing the software system.

The method of the present invention enables discovery of a service description 102 in the web service registry system 100 with a service name 101 that is not identical to a service name of the service description as stored in the web service registry system 100. By supporting discovery of the service description 102 without exactly matching service name, the method of the present invention makes the SOA software system loosely coupled or decoupled, and consequently more flexible and portable, and easier to concurrently develop client modules without fully-developed service modules. Without the method of the present invention, a client 199 of the SOA software system must know an exact service name to utilize corresponding service definition in developing client modules. Ordinarily, the client of the SOA software system is a programmer developing client modules utilizing service descriptions of the SOA software system. To know an exact service name, the client 199 must directly or indirectly communicate with web service developers to find a web service through a conventional method of the UDDI registry. The method of the present invention resolves the needs for communication between the client 199 and the web service developers, and consequently decouples service modules providing the web services and client modules and/or tasks utilizing the web services.

The method of the present invention enables the client 199 to integrate service descriptions into client modules being developed even when service modules are not completed and service names are not known to the client 199. Thus, the method of the present invention supports reducing the amount of time required for developing the SOA software system by permitting concurrent development of client modules and service modules instead of developing client modules after service modules.

The method of the present invention also makes the SOA software system more portable by overcoming naming convention peculiar to a certain service provider. Because the web service registry system 100 of the present invention can match the service name 101 to the service description 102 that is identified by a name that has similar meaning and interchangeable usage but not identical to the service name, there is no need to develop multiple client modules of the SOA software system with same functionality only to coordinate naming conventions between service modules and client modules. For example, provided that one car dealership uses "getCarPrice" and another car dealership uses "getAutomobilePrice" in respective client application to retrieve price of their respective brand of car, the method of the present invention eliminates a need to develop a separate client application for each car dealership, as opposed to being required by conventional SOA software systems using UDDI registries.

The web service registry system 100 comprises a registry 110, a name parser 120, a database-based dictionary 130, and a name composer 140. The web service registry system 100 receives the service name 101 as an input from the client 199 to perform a search for the service description 102 corresponding to the service name 101. After performing the search, the web service registry system 100 returns the service description 102 to the client 199 as a result.

The registry 110 searches a data repository of the registry 110 for the service description 102 corresponding to the service name 101 as provided by a client 199 or a candidate service name as composed by the name composer 140.

The name parser 120 receives the service name 101 from the registry 110 and parses the received service name 101. The name parser 120 produces a component word list comprising all words appearing in the service name 101. In one embodiment of the present invention, upon receiving the service name 101 "getCarPrice", the name parser 120 produces a component word list {"get", "car", "price"}.

The database-based dictionary 130 receives the component word list from the name parser 120 and produces a synonym list for each word in the component word list produced by the name parser 120. In one embodiment of the present invention, the database-based dictionary 130 comprises a dictionary database containing word data and a query process to process each word in the component word list and to generate a respective synonym list for each word in the component word list. In the same embodiment, the database-based dictionary 130 produces a synonym list {"get", "fetch", "obtain"} for a component word "get" of the component word list above. See FIG. 3, infra, for details.

The name composer 140 receives all synonym lists and produces a candidate service name list by ordering and concatenating synonyms in synonym lists. In one embodiment of the present invention, the name composer 140 produces a candidate service name list {"getCarPrice", "getVehiclePrice", "getAutomobilePrice", "obtainCarPrice", "obtainVehiclePrice", "obtainAutomobilePrice", "fetchCarPrice", "fetchVehiclePrice", "fetchAutomobilePrice"} with three synonym lists {"get", "fetch", "obtain"}, {"car", "vehicle", "automobile"}, and {"price"}.

Figure 2:
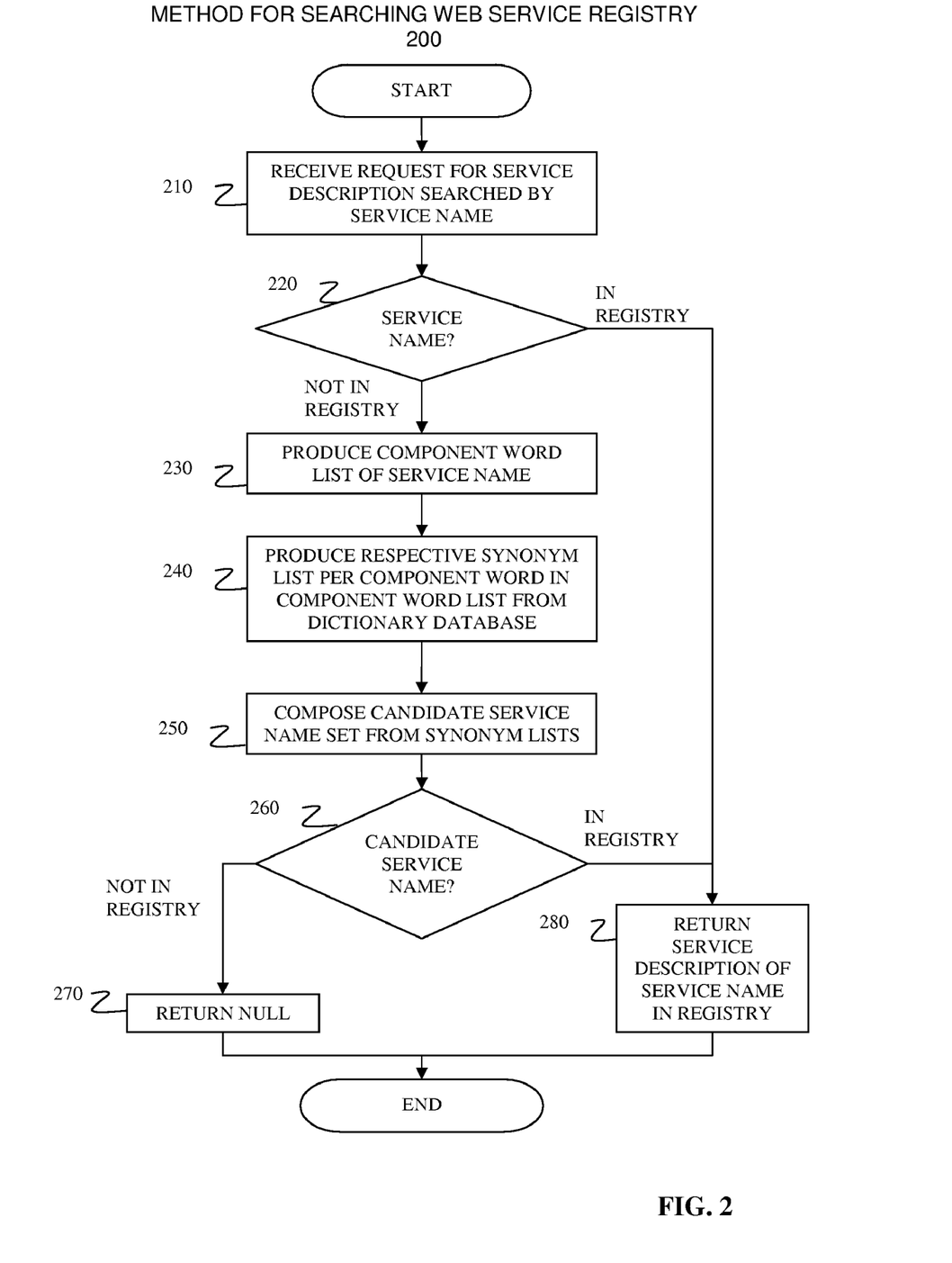
FIG. 2 is a flowchart depicting a method for searching a web service registry, in accordance with the embodiments of the present invention.

FIG. 2 is a flowchart depicting a method for searching a web service registry, in accordance with the embodiments of the present invention. The method of the present invention is performed by a web service search process which comprises a single process or multiple modules separated per functionality, as shown in FIG. 1, supra.

In step 210, the web service search process receives a request for a service description with a service name as a search key for the service description.

In step 220, the web service search process determines whether the received service name is registered in a registry of a web service registry system. If the web service search process determines that the service name is registered in the registry, the web service search process proceeds with step 280. If the web service search process determines that the service name is not registered in the registry, the web service search process proceeds with step 230. In another embodiment, steps 210 and 220 are performed by a separate module dedicated for searching the registry.

In step 230, the web service search process parses the received service name and produces a component word list comprising all words appearing in the received service name. In another embodiment of the present invention, step 230 is performed by a separate module dedicated for parsing name.

In step 240, the web service search process produces a respective synonym list for each word in the component word list from step 230. In another embodiment of the present invention, step 240 is performed by a separate module dedicated for locating synonyms in a dictionary database.

In step 250, the web service search process produces a candidate service name list. In one embodiment of the present invention, each candidate service name in the candidate service name list is composed as a concatenated string of words from each synonym list in an order of appearance as in the service name. In another embodiment of the present invention, step 250 is performed by a separate module dedicated for composing candidate service names from the synonym lists.

In step 260, the web service search process determines whether the composed candidate service name is registered in the registry of the web service registry system. If the web service search process determines that the candidate service name is registered in the registry, the web service search process proceeds with step 280. If the web service search process determines that the service name is not registered in the registry, the web service search process proceeds with step 270. In another embodiment, steps 210, 220, and 260 are performed by a separate module dedicated for searching the registry.

In step 270, the web service search process returns null to the client, because neither the service name provided in the search request nor the candidate service name composed by the web service search process is registered in the registry of the web service registry system, and consequently there is no web service description properly matching the service name in the search request.

In step 280, the web service search process returns the service description that matches to either the service name in the search request or candidate service names composed by the web service search process. If there is more than one service description found from searching candidate service names, the web service search process returns all matching service descriptions. Subsequent to performing step 270 or step 280, the web service search process terminates processing the service request and waits for another service request.

Figure 3:
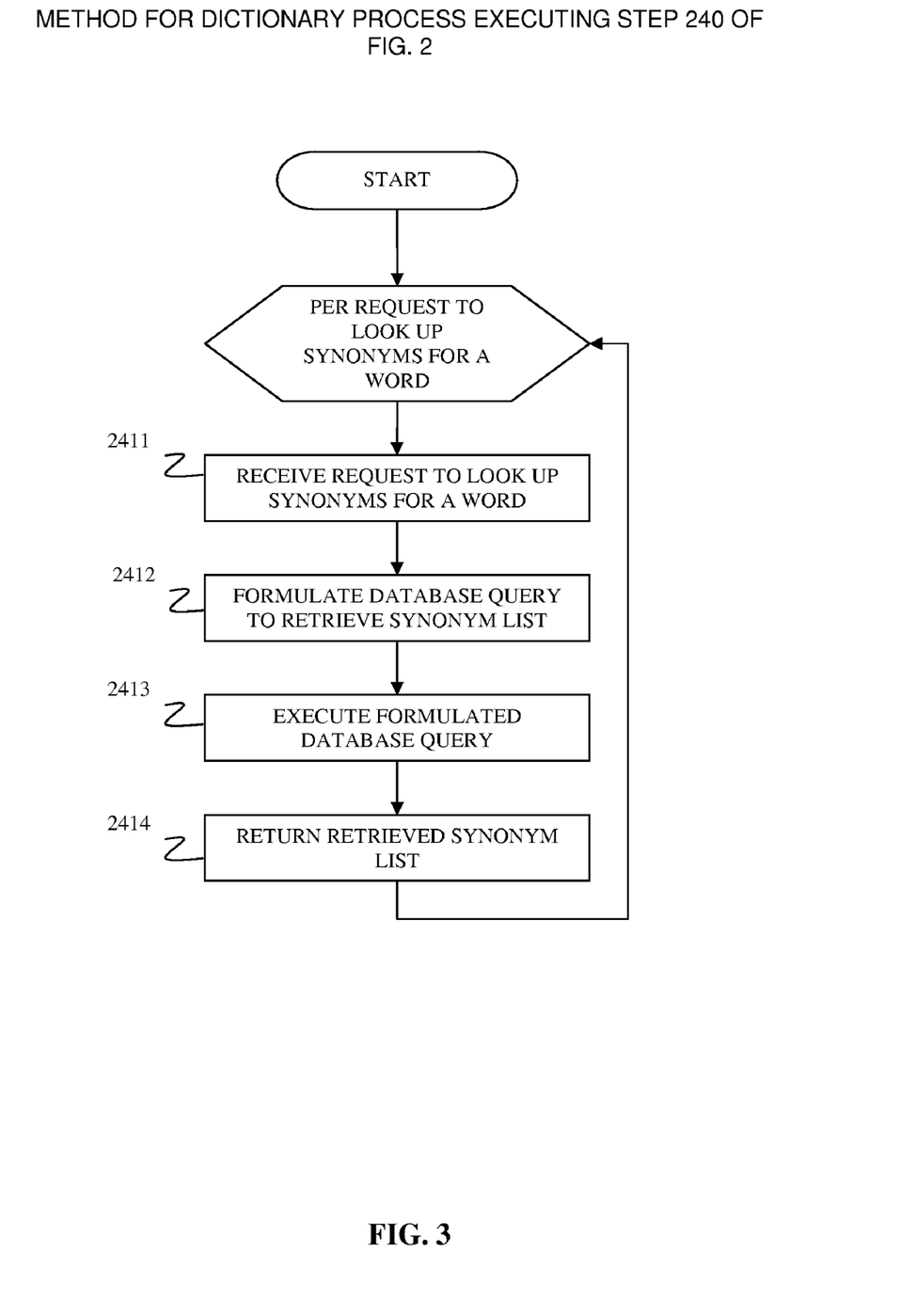
FIG. 3 is a flowchart depicting a method for implementing a dictionary of the web service registry system of FIG. 1, in accordance with the embodiments of the present invention.

FIG. 3 is a flowchart depicting a method for implementing a dictionary of the web service registry system of FIG. 1, supra, in accordance with the embodiments of the present invention.

In this embodiment, the dictionary is implemented as a separate module in the web service registry system. The dictionary comprises a dictionary process and a dictionary database. The dictionary process communicates with other processes in the web service registry system through sockets or socket-based messaging software. An example of messaging software may be, inter alia, WebSphere® MQ by IBM®. In another embodiment, the dictionary functionality may be provided as a web service.

The dictionary database table is created and instantiated prior to the dictionary process performs step 240 of FIG. 2, supra. Each word record is represented as a row of the dictionary database table. A word record of the dictionary database table is indexed by a primary key word and the rest of columns in the same row as the primary key word are synonym of the primary key word. Thus, the dictionary database table should be set up to contain enough number of rows for words in the dictionary database table and enough number columns in a row for synonyms for respective word. Also, each column should be in a size enough to store a longest possible word in the dictionary database table. All words in the dictionary database table is stored as a primary key word to make the word searchable, and consequently, a word may appear more than once in different columns of the dictionary database table. The dictionary database table may be prepared using customary database products and standard query languages such as SQL (Structured Query Language), etc.

In one embodiment of the present invention, the dictionary database table contains three words: car, vehicle, and automobile. In this embodiment, all three words are synonym of the other two words. The dictionary database table has three word records for each word, i.e., the first record of (*car*, vehicle, automobile), the second record of (*vehicle*, car, automobile), and the third record of (*automobile*, vehicle, car). Italicized word of each record is a primary key word of respective record, so each record can be searched by the primary key word.

In step 2411, the dictionary process receives a request to look up synonyms for a key word.

In step 2412, the dictionary process formulates a database query to retrieve a word record for the key word from the dictionary database table.

In step 2413, the dictionary process executes the formulated database query against the dictionary database table. As a result, the dictionary process retrieves the word record for the key word from the dictionary database table or a null if there is no word record is found in the dictionary database table.

In step 2414, the dictionary process returns a synonym list comprising words from the retrieved word record or a null if no word record is retrieved in step 2413.

Figure 4:
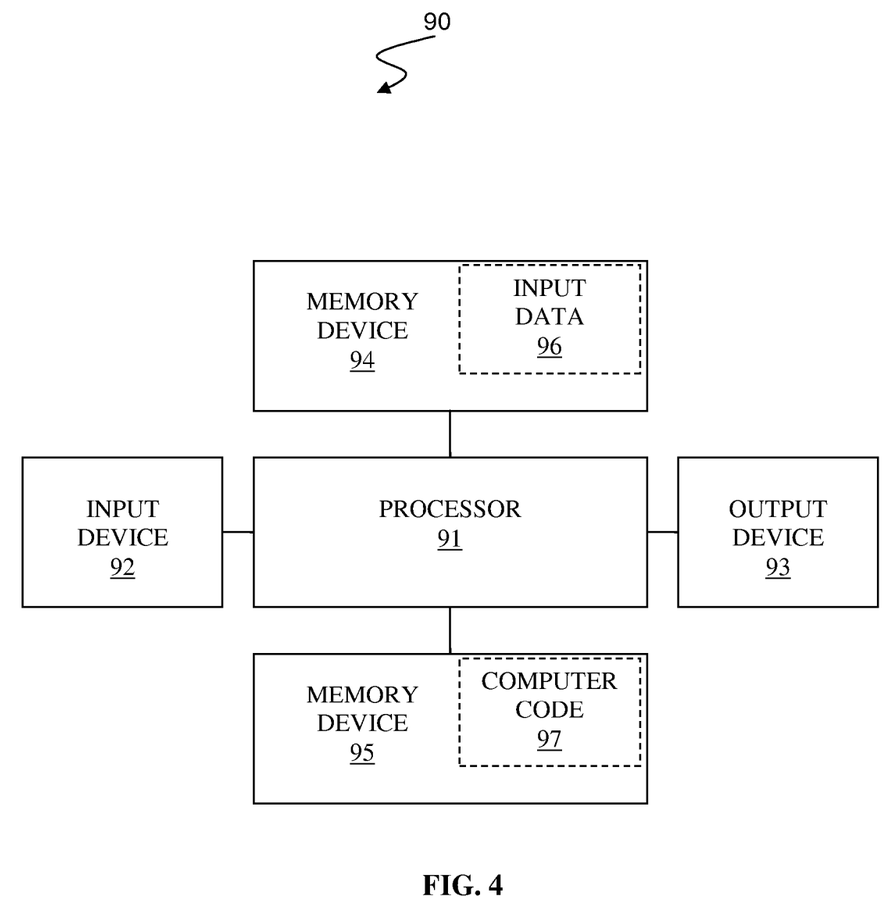
FIG. 4 illustrates a computer system used for looking up a web service registry system for a service name, in accordance with embodiments of the present invention.

FIG. 4 illustrates a computer system 90 used for looking up a web service registry system for a service name, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for looking up a web service registry system for a service name, according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for looking up a web service registry system for a service name.

In another embodiment, the invention provides a business method that performs the process steps of the invention on a subscription, advertising and/or fee basis. That is, a service provider, such as a Solution Integrator, can offer to create, maintain, support, etc. a process for extensible data interface for the shared service module of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for searching a service registry system with a service name, the method comprising:
    receiving a request to locate, in a registry of the service registry system, a service description that corresponds to the service name specified in the request, wherein the registry comprises at least one service description searchable by a respective service identifier;
    subsequent to said receiving, determining that the service name specified in the request does not match any service identifier discovered in the registry;
    subsequent to said determining, parsing the service name into at least one component word;
    subsequent to said parsing, producing a respective synonym list for each component word of said at least one component word from a dictionary database of the service registry system, wherein the dictionary database comprises at least one record, wherein each record of said at least one record comprises a respective primary key and zero or more synonym of the primary key, wherein said producing comprising:
        composing a first database query that retrieves a first record from the dictionary database, wherein a primary key of the first record matches a first component word of said at least one component word;
        executing said composed first database query against the dictionary database; and
        storing the first record acquired as a result of said executing to a first synonym list corresponding to the first component word of the service name;
    subsequent to said producing, generating at least one candidate service name with said respective synonym list for each component word;
    subsequent to said generating, concluding that a first candidate service name of said at least one candidate service name is located in the registry by finding a first service identifier in the registry that is identical to the first candidate service name; and
    subsequent to said concluding, sending a first service description that corresponds to the first service identifier in the registry to an output device of a computer system upon which the service registry system operates.

2. The method of claim 1, said generating comprising:
    replacing a first component word of said at least one component word with a first synonym from the first synonym list;
    subsequent to said replacing, storing a result from said replacing to a first candidate service name such that the first candidate service name synonymous to the service name is compared with service identifiers in searching the registry for the service description corresponding to the service name.

3. The method of claim 2, the method further comprising:
    iterating said replacing and said storing for each synonym in the first synonym list of the first component word; and
    upon completing said iterating, repeating said iterating for another synonym list of another component word of the service name for each component word of said at least one component word from said parsing.

4. The method of claim 1, the method further comprising:
    repeating said concluding and said sending for each candidate service name of said at least one candidate service name from said generating.

5. A computer program product, comprising a computer usable storage medium having a computer readable program code embodied therein, said computer readable program code containing instructions that when executed by a processor of a computer system implement a method for searching a service registry system with a service name, the method comprising:
    receiving a request to locate, in a registry of the service registry system, a service description that corresponds to the service name specified in the request, wherein the registry comprises at least one service description searchable by a respective service identifier;
    subsequent to said receiving, determining that the service name specified in the request does not match any service identifier discovered in the registry;
    subsequent to said determining, parsing the service name into at least one component word;
    subsequent to said parsing, producing a respective synonym list for each component word of said at least one component word from a dictionary database of the service registry system, wherein the dictionary database comprises at least one record, wherein each record of said at least one record comprises a respective primary key and zero or more synonym of the primary key, wherein said producing comprising:
        composing a first database query that retrieves a first record from the dictionary database, wherein a primary key of the first record matches a first component word of said at least one component word;
        executing said composed first database query against the dictionary database; and
        storing the first record acquired as a result of said executing to a first synonym list corresponding to the first component word of the service name;
    subsequent to said producing, generating at least one candidate service name with said respective synonym list for each component word;
    subsequent to said generating, concluding that a first candidate service name of said at least one candidate service name is located in the registry by finding a first service identifier in the registry that is identical to the first candidate service name; and
    subsequent to said concluding, sending a first service description that corresponds to the first service identifier in the registry to an output device of the computer system upon which the service registry system operates.

6. The computer program product of claim 5, said generating comprising:
    replacing a first component word of said at least one component word with a first synonym from the first synonym list;
    subsequent to said replacing, storing a result from said replacing to a first candidate service name such that the first candidate service name synonymous to the service name is compared with service identifiers in searching the registry for the service description corresponding to the service name.

7. The computer program product of claim 6, the method further comprising:
    iterating said replacing and said storing for each synonym in the first synonym list of the first component word; and upon completing said iterating, repeating said iterating for another synonym list of another component word of the service name for each component word of said at least one component word from said parsing.

8. The computer program product of claim 5, the method further comprising:
repeating said concluding and said sending for each candidate service name of said at least one candidate service name from said generating.

9. A computer system comprising a processor and a computer readable memory unit coupled to the processor, said memory unit containing instructions that when executed by the processor implement a method for searching a service registry system with a service name, the method comprising:
receiving, by the processor, a request to locate, in a registry of the service registry system, a service description that corresponds to the service name specified in the request, wherein the registry comprises at least one service description searchable by a respective service identifier;
subsequent to said receiving, determining that the service name specified in the request does not match any service identifier discovered in the registry;
subsequent to said determining, parsing the service name into at least one component word;
subsequent to said parsing, producing a respective synonym list for each component word of said at least one component word from a dictionary database of the service registry system, wherein the dictionary database comprises at least one record, wherein each record of said at least one record comprises a respective primary key and zero or more synonym of the primary key, wherein said producing comprising:
composing a first database query that retrieves a first record from the dictionary database, wherein a primary key of the first record matches a first component word of said at least one component word;
executing said composed first database query against the dictionary database; and
storing the first record acquired as a result of said executing to a first synonym list corresponding to the first component word of the service name;
subsequent to said producing, generating at least one candidate service name with said respective synonym list for each component word;
subsequent to said generating, concluding that a first candidate service name of said at least one candidate service name is located in the registry by finding a first service identifier in the registry that is identical to the first candidate service name; and
subsequent to said concluding, sending a first service description that corresponds to the first service identifier in the registry to an output device of the computer system upon which the service registry system operates.

10. The computer system of claim 9, said generating comprising:
replacing a first component word of said at least one component word with a first synonym from the first synonym list;
subsequent to said replacing, storing a result from said replacing to a first candidate service name such that the first candidate service name synonymous to the service name is compared with service identifiers in searching the registry for the service description corresponding to the service name.

11. The computer system of claim 10, the method further comprising:

iterating said replacing and said storing for each synonym in the first synonym list of the first component word; and
upon completing said iterating, repeating said iterating for another synonym list of another component word of the service name for each component word of said at least one component word from said parsing.

12. The computer system of claim 9, the method further comprising:
repeating said concluding and said sending for each candidate service name of said at least one candidate service name from said generating.

13. A process for supporting computer infrastructure, said process comprising automatically executable process software providing at least one support service for at least one of creating, integrating, hosting, maintaining, and deploying a computer-readable code in a computing system, wherein the computer-readable code in combination with the computing system is capable of performing a method for searching a service registry system with a service name, the method comprising:
receiving a request to locate, in a registry of the service registry system, a service description that corresponds to the service name specified in the request, wherein the registry comprises at least one service description searchable by a respective service identifier;
subsequent to said receiving, determining that the service name specified in the request does not match any service identifier discovered in the registry;
subsequent to said determining, parsing the service name into at least one component word;
subsequent to said parsing, producing a respective synonym list for each component word of said at least one component word from a dictionary database of the service registry system, wherein the dictionary database comprises at least one record, wherein each record of said at least one record comprises a respective primary key and zero or more synonym of the primary key, wherein said producing comprising:
composing a first database query that retrieves a first record from the dictionary database, wherein a primary key of the first record matches a first component word of said at least one component word;
executing said composed first database query against the dictionary database; and
storing the first record acquired as a result of said executing to a first synonym list corresponding to the first component word of the service name;
subsequent to said producing, generating at least one candidate service name with said respective synonym list for each component word;
subsequent to said generating, concluding that a first candidate service name of said at least one candidate service name is located in the registry by finding a first service identifier in the registry that is identical to the first candidate service name; and
subsequent to said concluding, sending a first service description that corresponds to the first service identifier in the registry to an output device of the computer system upon which the service registry system operates.

14. The process of claim 13, said generating comprising:
replacing a first component word of said at least one component word with a first synonym from the first synonym list;
subsequent to said replacing, storing a result from said replacing to a first candidate service name such that the first candidate service name synonymous to the service name is compared with service identifiers in searching the registry for the service description corresponding to the service name.

15. The process of claim 14, the method further comprising:
iterating said replacing and said storing for each synonym in the first synonym list of the first component word; and
upon completing said iterating, repeating said iterating for another synonym list of another component word of the service name for each component word of said at least one component word from said parsing.

16. The process of claim 13, the method further comprising:
repeating said concluding and said sending for each candidate service name of said at least one candidate service name from said generating.

* * * * *